United States Patent
Horsey et al.

[15] 3,657,027
[45] Apr. 18, 1972

[54] INJECTION MOLDABLE FLAMMABLE COMPOSITION AND DEVICES MADE THEREFROM

[72] Inventors: Eleanor F. Horsey, Chevy Chase, Md.; Joseph W. Warwick, Washington, D.C.; Horst W. Rauhut, Crystal Lake, Ill.

[73] Assignee: The United States of America as represented by the Secretary of the Army

[22] Filed: Apr. 9, 1969

[21] Appl. No.: 814,584

[52] U.S. Cl.....................................149/19, 149/20, 149/29, 149/44, 102/70
[51] Int. Cl..............................................C06c 7/00
[58] Field of Search......................149/19, 29, 20, 44; 102/70

[56] References Cited
UNITED STATES PATENTS 2,062,191   11/1936   Pullen...............................149/29 X
2,574,466   11/1951   Clay et al..........................149/29 X Primary Examiner—Benjamin R. Padgett
Assistant Examiner—Stephen J. Lechert, Jr.
Attorney—Harry M. Saragovitz, Edward J. Kelly, Herbert Berl and J. D. Edgerton

[57] ABSTRACT

An injection moldable flammable composition consisting of a powder comprising 30–80 percent of red phosphorus and 70–20 percent of a polymeric binder comprising polyethylene, polypropylene, or copolymer thereof. Flammability and stability may be increased by the addition of lesser quantities of polystyrene and ignition aids and anti-oxidants such as aluminum oxide. Flammable strikers and other useful devices may be molded from this composition.

9 Claims, 4 Drawing Figures

PATENTED APR 18 1972 3,657,027

INVENTOR
ELEANOR F. HORSEY
JOSEPH W. WARWICK
HORST W. RAUHUT

BY Harry M. Saragovitz, Edward J. Kelly
Herbert Berl and J. D. Edgerton

ATTORNEYS

INJECTION MOLDABLE FLAMMABLE COMPOSITION AND DEVICES MADE THEREFROM

This invention relates to injection moldable flammable compositions and to flammable strikers, and other useful flammable devices, made from such compositions.

Flammable strikers are designed to ignite and burn when driven into a cup containing a suitable strong oxidizing agent. The combination of phosphorus-coated striker and chlorate-containing cup constitutes an igniter particularly adapted to set off the powder block used in activating a thermal battery.

Phosphorus-coated strikers were previously prepared by dip-coating a supporting stud with red phosphorus dispersed in lacquer. More recently, the natural shellac binder of the lacquer has been replaced by a synthetic shellac based on plasticized cellulose ester derivatives. Strikers prepared from synthetic shellac become brittle with time, due to migration of the plasticizer, and deteriorate on extended storage and handling. Dip-coating with either artificial or natural shellac lacquers does not give rise to precisely shaped strikers having an accurately controllable red phosphorus content.

It is a principal object of the present invention to provide a molding powder suitable for use in making flammable strikers, and other useful flammable devices, by injection molding.

It is a further object of the invention to provide improved flammable strikers capable of withstanding the adverse effects of extended storage and handling.

It is yet another object of the present invention to provide flammable strikers of precise shape and reproducible red phosphorus content.

These and other objects and advantages of the present invention will become apparent on consideration of the composition and manufactures described herein and in the accompanying drawings wherein.

The present invention is a molding powder consisting essentially of 30–80 percent of a polyalkylene, e.g., red phosphorus and 70–20 percent of polyethylene, polypropylene or copolymer thereof, having a softening point above 205° F. and a melt index of at least 5.0. The present invention also contemplates the molded flammable strikers, and other useful molded flammable devices, fabricated from such molding powders.

Compositions according to the present invention are particularly suitable for use in the fabrication of flammable strikers by injection molding techniques. High density polyethylene or polypropylene or copolymers consisting essentially thereof possess the properties of stability, flexibility and flammability required for the resinous matrix or binder. Since the striker is intended for use in a thermal battery to be dried for several hours at 200° F., the particular polyalkylene utilized must have a vicat softening point, when tested according to ASTM D1525–58T, above 205° F. At the same time, the polyalkylene should have a melt index of at least 5.0, when tested according to ASTM D1238–62-T, in order to contribute sufficiently low viscosity and low frictional heat to the melt so that it will be moldable below the ignition temperature of red phosphorus (about 392° F.) by modern injection molding machinery.

It is noted that while other polymers may possess certain of the desirable attributes indicated above, polyalkylenes appear unique in that they can be injection molded with red phosphorus to provide an adequate flammable striker. For example, compositions containing acrylic resin, polymethyl methacrylate or polymethyl methacrylate mixed with ethylene-vinyl acetate copolymer as the resin binder occasionally ignited during molding.

Up to 10 percent by weight of polystyrene may be added to the molding powder to increase flammability of the resultant striker. Polystyrene requires higher molding temperatures than do the polyalkylenes, and is more brittle, and the addition of further polystyrene may result in a composition which ignites on molding, or a striker which embrittles at low temperatures. In addition, or alternately, an ignition or burning aid such as aluminum oxide may be added to the molding powder to promote burning during ignition. Skilled persons will readily understand that burning aids such as aluminum oxide have the additional advantage of serving also as stabilization aids or anti-oxidants; aluminum oxide, and also other burning aids that will readily occur to skilled persons, will also neutralize the phosphoric acid that may be formed when phosphorus is subjected to elevated temperatures and humidities.

Figure 1:
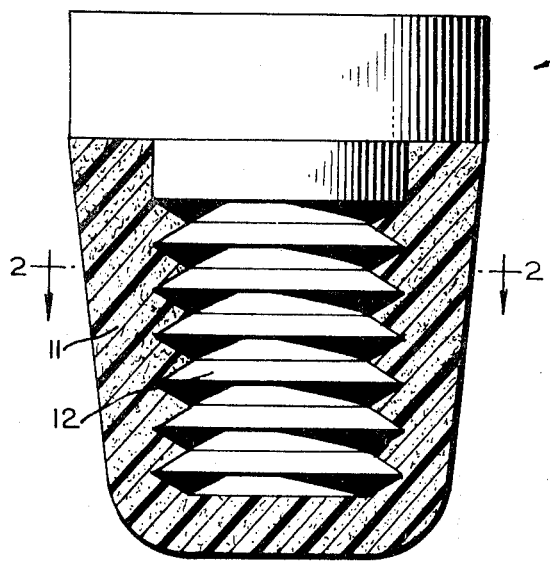
FIG. 1 is a view in section of a flammable striker according to the present invention.
Figure 2:
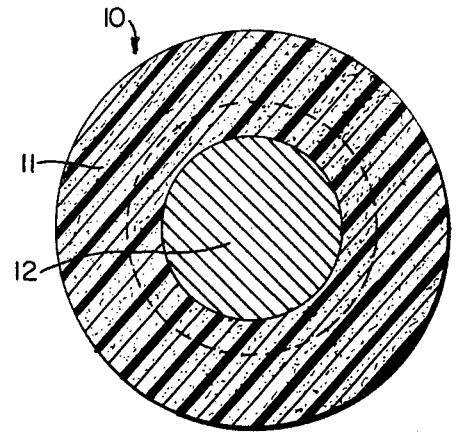
FIG. 2 is a view in section along line 2—2 of FIG. 1.
Figure 3:
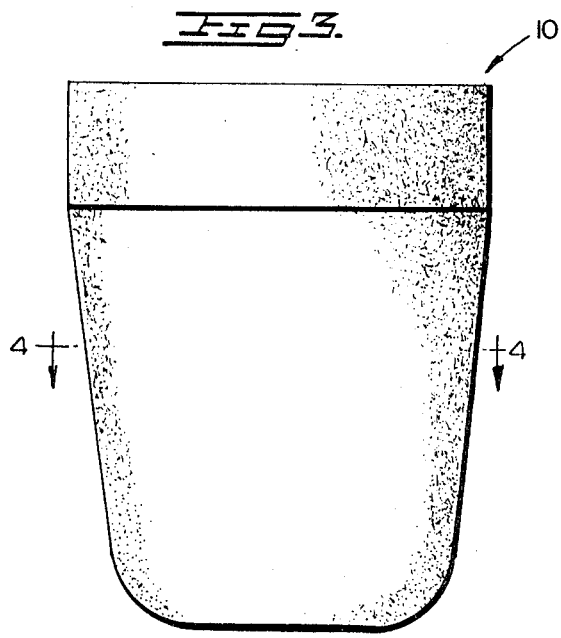
FIG. 3 is a side elevational view of a unitary molded flammable striker according to a further embodiment of the present invention.
Figure 4:
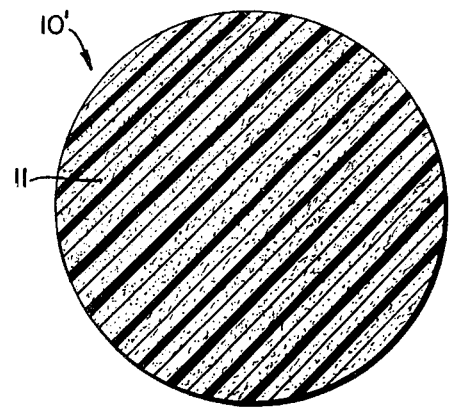
FIG. 4 is a view in section along line 4—4 of FIG 3.

As illustrated in FIGS. 1 and 2, a flammable striker 10 may be fabricated by injection molding the molding compositions 11 of the present invention about a supporting stud 12. Alternately, as illustrated in FIGS. 3 and 4, the stud may be eliminated and these compositions injection molded to form a shaped unitary flammable striker 10′.

Our invention is further illustrated by means of the following non-limiting examples wherein powders having the indicated compositions were injection molded at 320°–325° F. and 4,000 psi about a stud to precisely shaped flammable strikers. The phosphorus utilized was red phosphorus stabilized against oxidation by a surface treatment of aluminum hydroxide; it conformed to Military Specification MIL–P–670 A.

The representative polyalkylene utilized was a high density polyethylene having a softening point of 250±5° F. and a melt index of 12.

| | |
|---|---|
| I. | 50% red phosphorus |
| | 50% polyethylene |
| II. | 60% red phosphorus |
| | 36% polyethylene |
| | 4% aluminum oxide |
| III. | 60% red phosphorus |
| | 30% polyethylene |
| | 6% polystyrene |
| | 4% aluminum oxide |

Other polyalkylenes having softening points no lower than 205° F., and melt indexes above 20 are available, and suitable, and would permit an increase in the other constituents by virtue of the decreased viscosity of the melt.

The strikers molded from these compositions were not deformed on standing for one day at about 220° F. and were stable under normal storage conditions. The strikers behaved in a satisfactory manner on testing as part of a complete igniter in thermal batteries. The composition designated III burned most rapidly leaving the least amount of residue.

Other variations in the basic composition of the present invention will suggest themselves to those skilled in the art and our invention is as claimed. Furthermore, it will be obvious to skilled persons that numerous other novel and useful flammable devices other than strikers—for example, combustible cartridge cases—may be made in accordance with our invention.

We claim:

1. A molding powder consisting essentially of 30–80 percent by weight of red phosphorus and 70–20 percent by weight of polyalkylene having a softening point above 205° F. and a melt index of at least 5.0.

2. A molding powder according to claim 1 wherein said polyalkylene is polyethylene, polypropylene or copolymers thereof.

3. A molding powder according to claim 2 containing up to 10 percent by weight of polystyrene.

4. A molding powder according to claim 2 containing an ignition or burning aid.

5. A molding powder according to claim 3 containing an ignition or burning aid.

6. A molding powder consisting essentially of 60 percent of red phosphorus, 30 percent of polyethylene having a softening point of 250±° F. and a melt index of 12, 6 percent of polystyrene and 4 percent of aluminum oxide.

7. A shaped flammable striker comprising 30–80 percent of red phosphorus and 70–20 percent of polyethylene, polypropylene or copolymer thereof molded about a supporting stud.

8. A molded flammable device comprising 30–80 percent of red phosphorus and 20–70 percent of polyethylene, polypropylene, or copolymers thereof.

9. The invention as defined in claim 8 wherein said device comprises a shaped unitary striker.

* * * * *